(12) United States Patent
Chen

(10) Patent No.: US 8,052,771 B2
(45) Date of Patent: Nov. 8, 2011

(54) REMOVABLE DUST COLLECTING DEVICE FOR AN AIR CONDUIT

(76) Inventor: Da-Kai Chen, Chungli (TW)

( * ) Notice: Subject to any disclaimer, the term of this patent is extended or adjusted under 35 U.S.C. 154(b) by 166 days.

(21) Appl. No.: 12/694,283

(22) Filed: Jan. 27, 2010

(65) Prior Publication Data

US 2011/0179756 A1 Jul. 28, 2011

(51) Int. Cl.
*B01D 46/00* (2006.01)
(52) U.S. Cl. .......... 55/524; 55/DIG. 24; 95/285
(58) Field of Classification Search .......... 55/435, 55/465, 524, DIG. 14, DIG. 24; 95/285; 73/28.05, 863.22; 210/506
See application file for complete search history.

(56) References Cited

U.S. PATENT DOCUMENTS 6,779,976 B1 * 8/2004 Carfagna et al. .......... 416/5
* cited by examiner

*Primary Examiner* — Robert Clemente

(57) ABSTRACT

A dust collecting device (100) installed inside of an air conduit (51) for collecting airborne particles and for filtrating the air consists of a dust collecting tubes set (1). Said dust collecting tubes set (1) comprises of a plurality of dust collecting tubes (2a-2f) having different diameters. Said tubes (2a-2f) are arranged in a concentric fashion by having a tube with smaller diameter covered by one having larger diameter. Each of said dust collecting tubes (2a-2f) is applied with a layer of adhesive layer (3) for coupling with each other and for adhering particles contained in the air. Each tube of the tube set (1) can be removed from said air conduit (51) by pulling a pull string (4a-4f) provided at two extreme ends of each dust collecting tube (2a-2f).

6 Claims, 7 Drawing Sheets

REMOVABLE DUST COLLECTING DEVICE FOR AN AIR CONDUIT

BACKGROUND OF THE INVENTION

1. Field of the Invention

The present invention relates to a dust collecting device which is set inside an air conduit of a HVAC system for collecting dust and suspended particles contained in the air.

2. Description of Prior Art

A heating, ventilation, air-conditioning and cooling, also known as HVAC, is a system that usually installed in industrial plants, office buildings or skyscrapers for regulating and maintain the air to be safe and health. The regulated air generated by a single or multiples air conditioning devices is transported to each corner of the facilities or buildings through central ventilation duct and multiple sub pipes connected thereto. Even though filters are attached to said air conditioning devices or air outlets for filtering the air, the passages of central ventilation duct or sub pipes are usually difficult to clean due to the size and multiple curve areas, and as time goes by, dust, tiny particles will be accumulated at inner wall of the ventilation duct and contaminate the air, causing respiratory diseases. Thus to invent a device to prevent substance accumulated in the air conduit has become the main objective of the present invention.

SUMMARY OF THE INVENTION

To solve aforementioned problem, a dust collecting device for a ventilation duct or air conduit is set about an inner wall hereof. Said dust collecting device consists of a dust collecting tube sets, wherein each collecting tube has different diameter. Said dust collecting tubes are arranged in a concentric fashion, which the tube having smaller diameter is covered by one having larger diameter. A reusable adhesive layer is applied on the inner wall of all dust collecting tubes for attaching each other and collecting the dust or substance; said adhesive layer is also applied on the outer wall of the outmost dust collecting tube for attaching with the ventilation duct. Pull strings are provided alongside each tube and extended from both ends hereof, thus when the adhesive layer is covered with substance and loses its function, it can be removed by pulling the string and allow the following tube with fresh adhesive layer to collect the substance. An antibiotic, a germicidal, a deodorant material or a combination of three can be applied additionally to the adhesive layer to improve the filtrating function of the device.

The advantages of said dust collecting device are described hereinafter:

1. By setting a series of soft tubes having an adhesive layer inside the ventilation duct or air passage, dust, tiny particles or other harmful substances will be collected and stuck by adhesive. Unlike the conventional design that substance smaller than the filtration hole of the filter can pass easily and harm the person who inhales, the adhesive layer can capture different sizes of substances that contained in the air, improving the quality of air circulating in the building.
2. Even though filters provided on conventional ventilation duct or outlets are easily to be removed and cleaned, to clean inside the ventilation duct is a tough task. The maintenance is usually performed by entering the air conduit directly or using robot. Sending personnel directly into the conduit does clean perfectly, but for the sub pipes which connected to the central ventilation conduit, the sizes are usually much smaller to fit a person. The robot can clean the area where a person can't enter. However, high cost makes it inconvenient to most medium or small office buildings. Besides the cost, the function range of the robot is limited by the reception, and since the passage is mostly made of metal, the reception is constantly affected. By setting the dust collecting device, it requires no personnel with special training to operate as robot and cost is low. The pull string helps the user to remove the tube easily and rapidly.

DETAILED DESCRIPTION OF PREFERRED EMBODIMENTS

Figure 1:
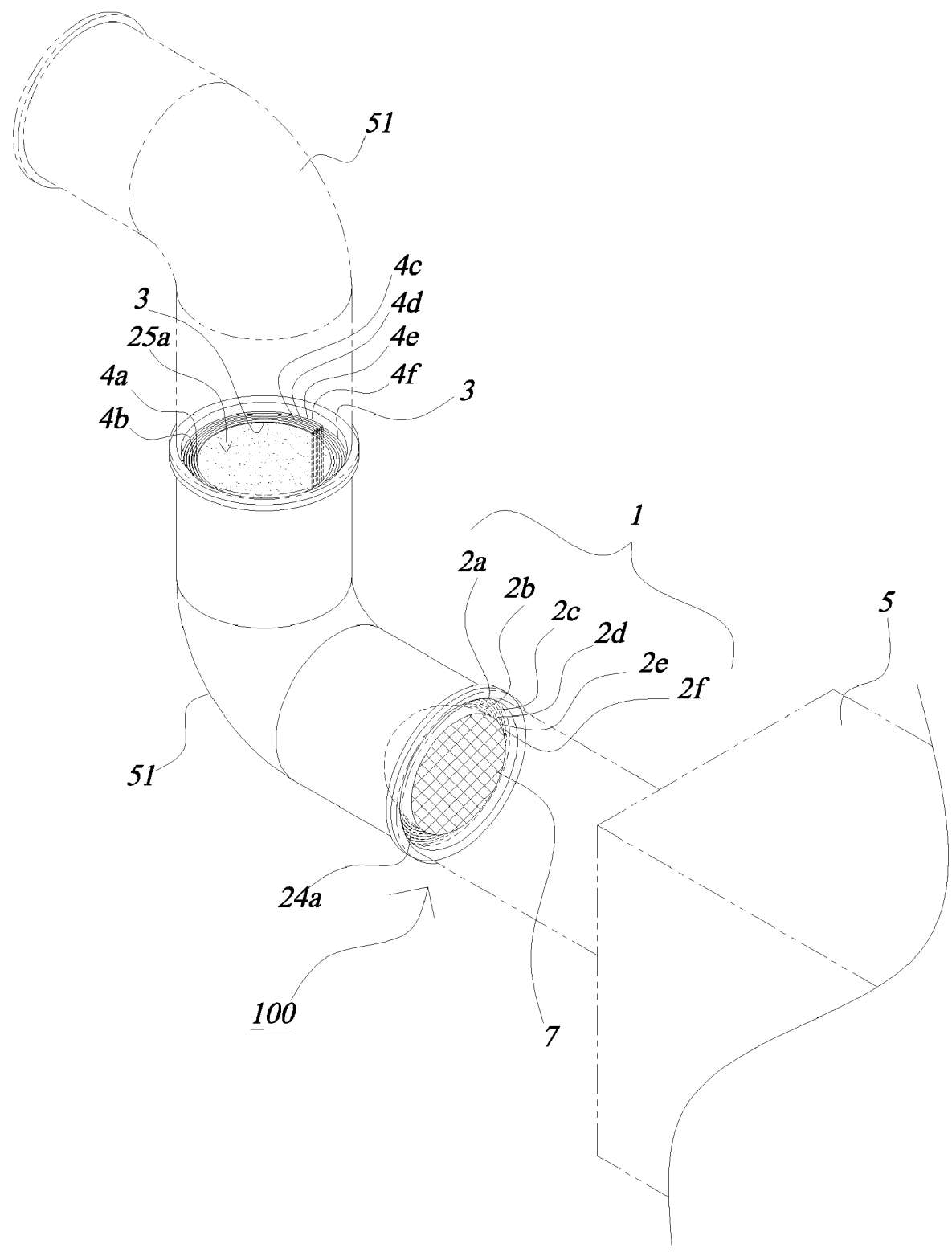
FIG. 1 is a schematic view of the present invention attached to an air conditioning device.
Figure 2:
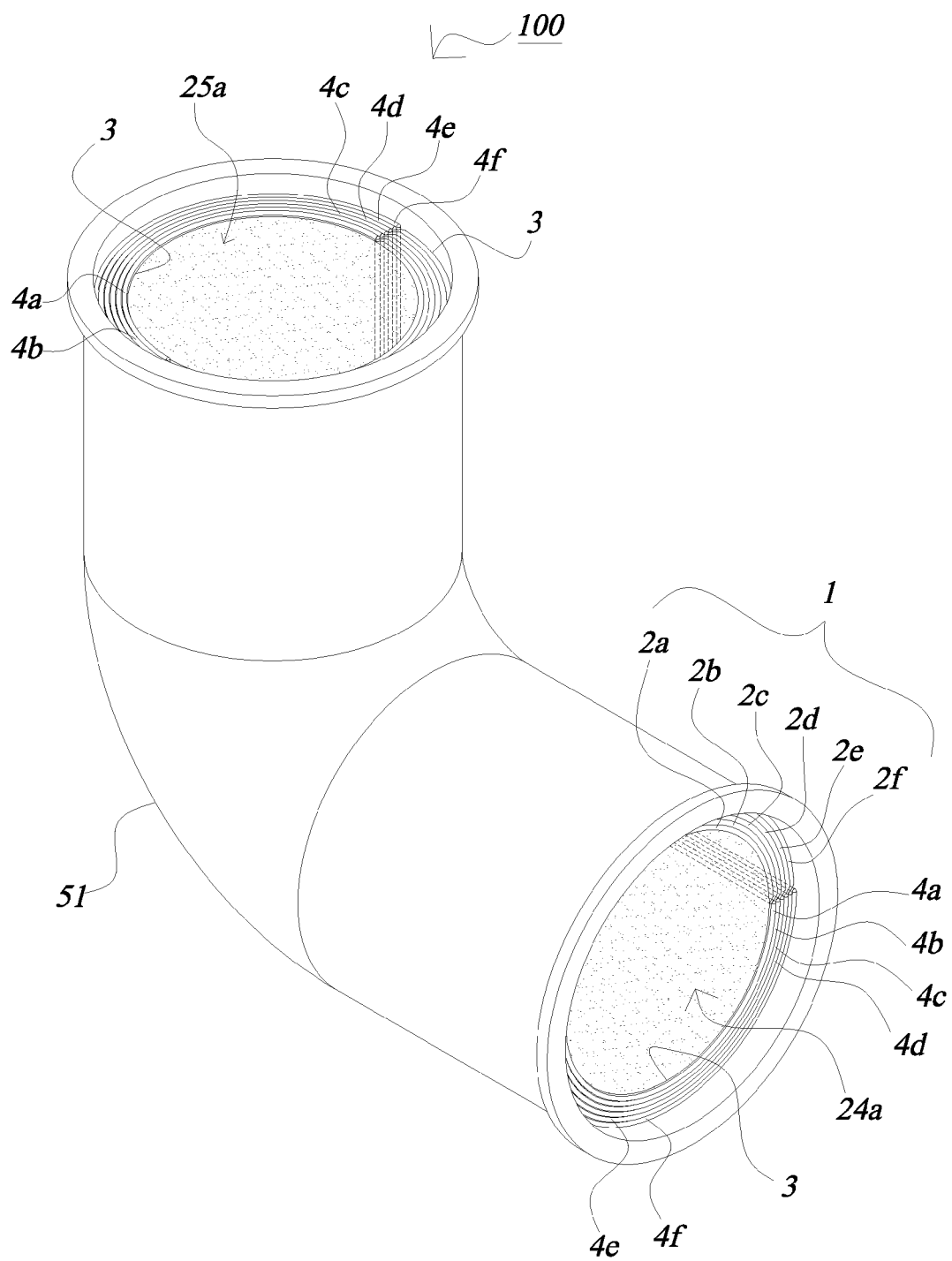
FIG. 2 is a schematic view of the present invention without attaching to a filter.
Figure 3:
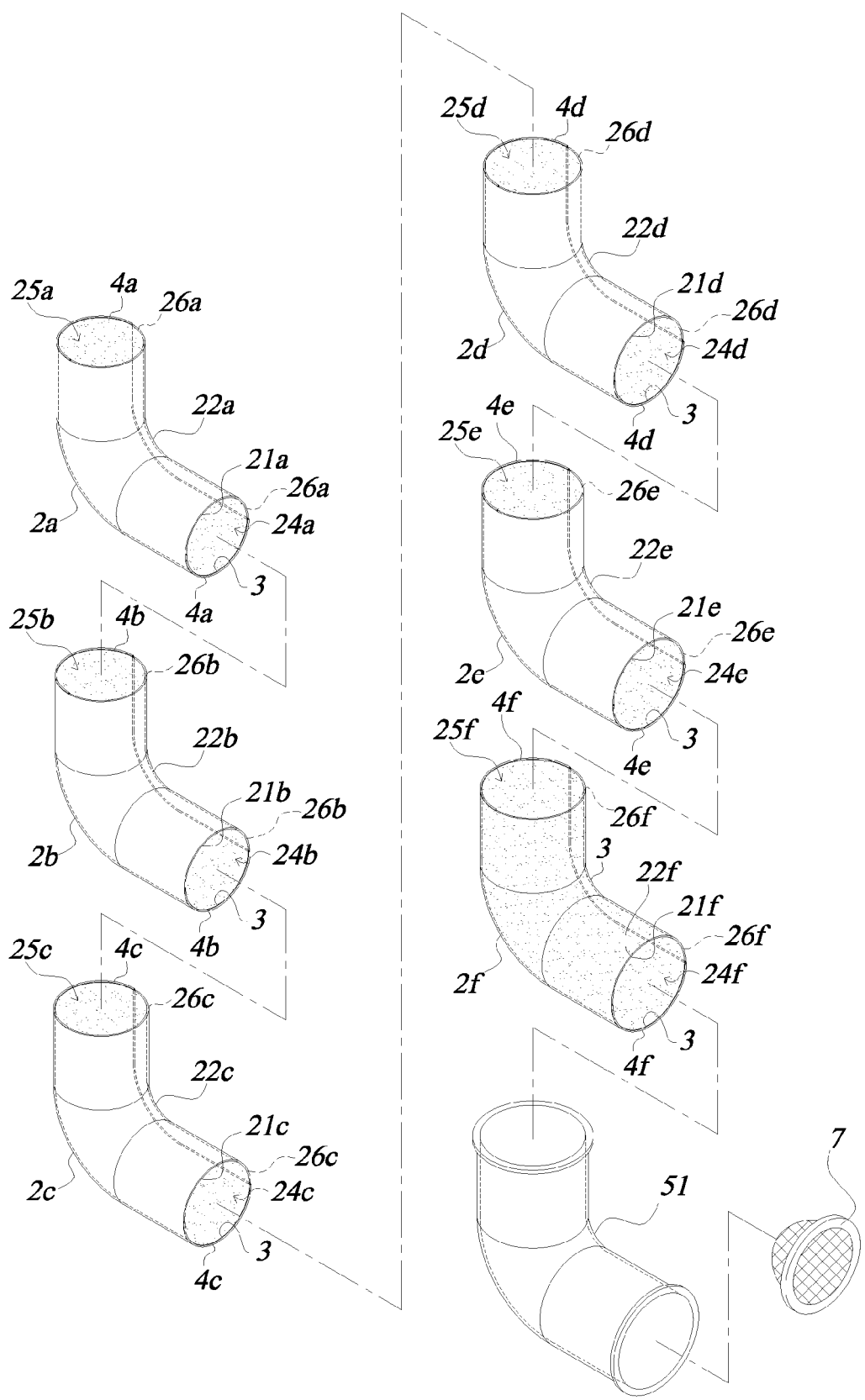
FIG. 3 is an exploded view illustrating each dust collecting tube of the device.
Figure 4:
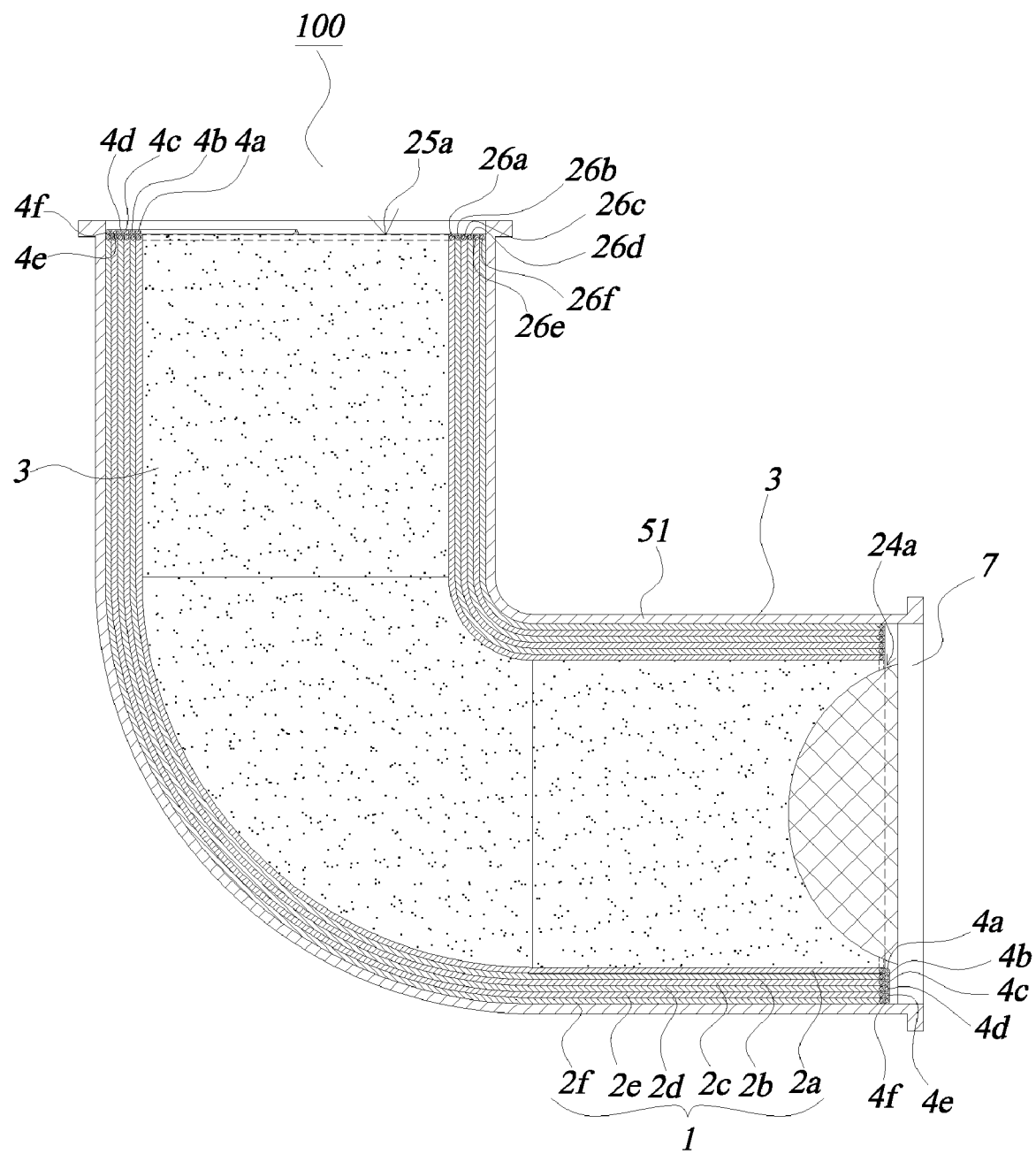
FIG. 4 is a sectional view of the present invention with engagement of the filter.

Referring to FIGS. 1-4 and 7, a removable dust collecting device (100) for an air conduit is characterized in that including a dust collecting tubes set (1). The set (1) is provided about an inner wall of an air conduit (51). Said set (1) consists essentially of a plurality of hollow dust collecting tubes (2a-2f) made of soft material and having different diameters. The dust collecting tubes (2a-2f) are arranged in a concentric fashion by covering the tube having small diameter with another one having larger diameter. Said tubes (2a-2f), after collecting dust to its maximum capacity, are removed from the air conduit (51) sequentially from the smallest diameter.

An adhesive layer (3) is provided on each inner surface (21a-21f) of said dust collecting tubes (2a-2f) and an outer surface (22f) of the outmost dust collecting tube (2f) for attaching to each other and collecting dust.

Concentric intakes (24a-24f) with different diameters are provided respectively at an end of corresponding dust collecting tubes (2a-2f) where close to an air conditioning unit (5). Concentric outlets (25a-25f) are also provided respectively at an end of corresponding dust collecting tubes (2a-2f) where connected to an air conditioning tube (51), and a series of pull strings (4a-4f) are provided alongside the corresponding dust collecting tubes (2a-2f) and extended from two extreme ends hereof for facilitating the removal of the dust collecting tubes (2a-2f).

The dust collecting tube set (1) formed by multiples collecting tubes (2a-2f) with different diameters is coupled with the inner wall of the air conduit (51) by the adhesive layer (3) applied on the outer surface of the outmost tube (2f). The fastened tube set (1) provides an air filtration and purification features without interfering air flow within the air conduit (51).

Besides than coupling dust collecting tubes (2a-2f) with each other, the main function of said adhesive layer (3) is to collect any harmful substance (6) contained in the air (e.g. dust or airborne particles). Conventional air filter can only hold the substance and with possibility to fall when too much is accumulated. Further, the size of filtration pore determines the types of substances can be collected and air volume. With the adhesive layer (3), the substance (6) of all sizes is securely adhered thereon for improving the air quality without affecting the air volume.

Conventional air conduit cleaning sometimes can also be performed by robot. However, high cost and operating range restriction makes it unsuitable for some facilities. Said dust collecting device (100) has relatively lower cost and with less install limitation. The pull strings (4a-4f) attached to each of dust collecting tubes (2a-2f) allows it to be operated and removed by any person.

The maintenance of the air conduit (51) can be performed periodically or irregularly. User can observe the amount of substance (6) collected by the adhesive layer (3) to determine whether the removal of dust collecting tube is required. For a new dust collecting device (1), the innermost tube (2a), which has the smallest diameter is to be removed primarily. Once the dust collecting tube (2a) is removed, the following tube (2b) becomes the innermost tube. Sequentially, the dust collecting device (100) functions until the outmost tube (2f) is removed from the air conduit (51). A tube set (1) of six dust collecting tubes (2a-2f) is disclosed for the present invention. However, the numbers of dust collecting tubes for said device (100) can be vary and should not be limited.

For air conduit (51) that includes single or multiples side outlets (511) for connecting to a sub-conduit or serving as maintenance entrance (not shown), single or multiples side openings (23a-23f) are provided respectively on the body of each said dust collecting tubes (2a-2f). The side openings (23a-23f) correspond to where the side outlets (511) are provided.

A series of inlets (24a-24f) having different diameters are provided at where said dust collecting tubes (2a-2f) engaged with the air conditioning unit (5). A removable air filter (7) can be further attached to the inlets (24a-24f). With the installation of the air filter (7), the air filtration is upgraded to a two steps cleaning, using air filter (7) to hold the larger airborne particles and the adhesive layer for smaller dust or substance.

The soft material for manufacturing said dust collect tubes (2a-2f) can be selected from fabric or paper, depending on the requirement of different customer. Fabric is believed to be the preferred material for manufacturing said tubes (2a-2f) for its properties such as high strength, washable and recyclable. A recycle dust collecting tube will only need to be washed and replaced said adhesive layer (3). Either paper or fabric will be disintegrated in a short period in the natural environment comparing with other materials.

Besides than visible substances, air that traveled within the air conduit (51) may also contain bad odor or bacteria which can't be collected with the adhesive layer (3). For improving the efficiency of said adhesive layer (3), antibiotic, germicidal or deodorant materials can be add separately or in combination to the adhesive layer (3), thus the air inhaled by people will be safer and fresher.

To ensure that substances adhered by the adhesive layer (3) will be kept securely inside the dust collecting tubes (2a-2f) when are removed, a series of closing circles (26a-26f) attached with said pull strings (4a-4f) are provided at both ends of each tube (2a-2f). Thereby pulling the pull string (4a), said closing circles (26a) provided on both ends of the innermost dust collecting tubes (2a) will be driven and constricted until both intake (24a) and outlet (25a) are sealed, avoiding dust or particles falling onto the adhesive layer (3) of following tube (2b) or inhaled by the maintenance staff.

Figure 5:
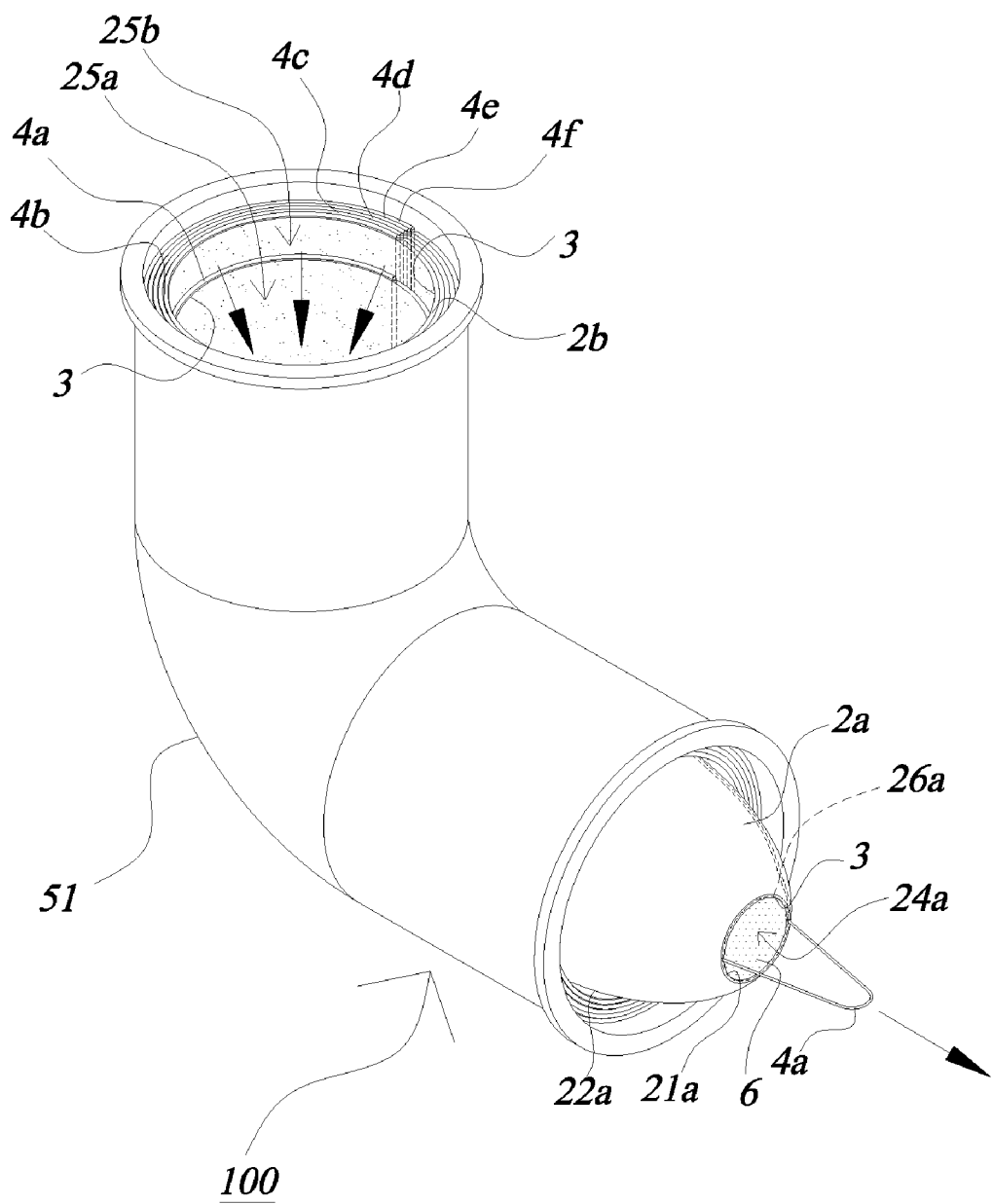
FIG. 5 is a schematic view of the present invention showing the removal of a dust collecting tube.
Figure 6:
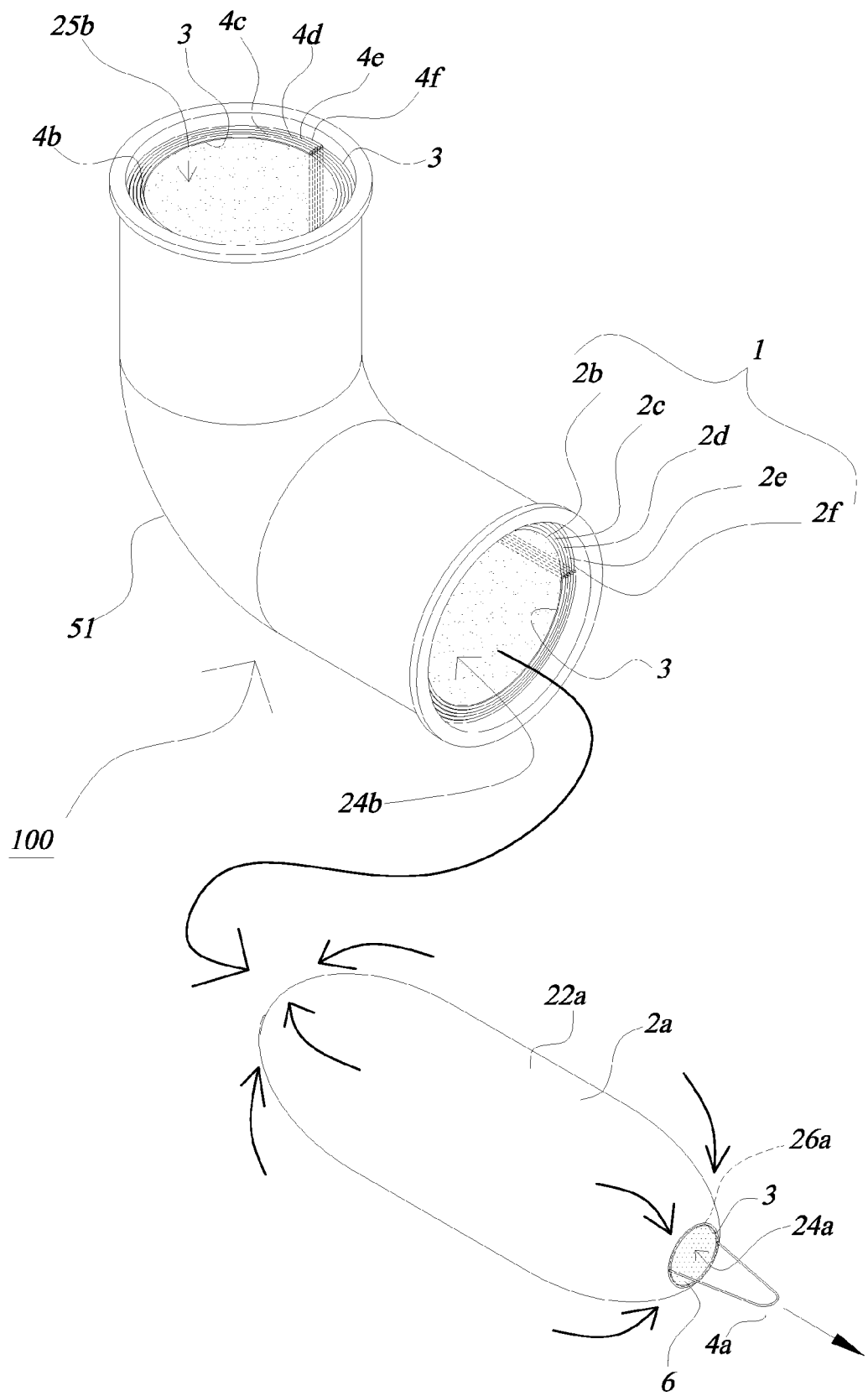
FIG. 6 is a schematic view of the present invention showing the closure of removed tube.
Figure 7:
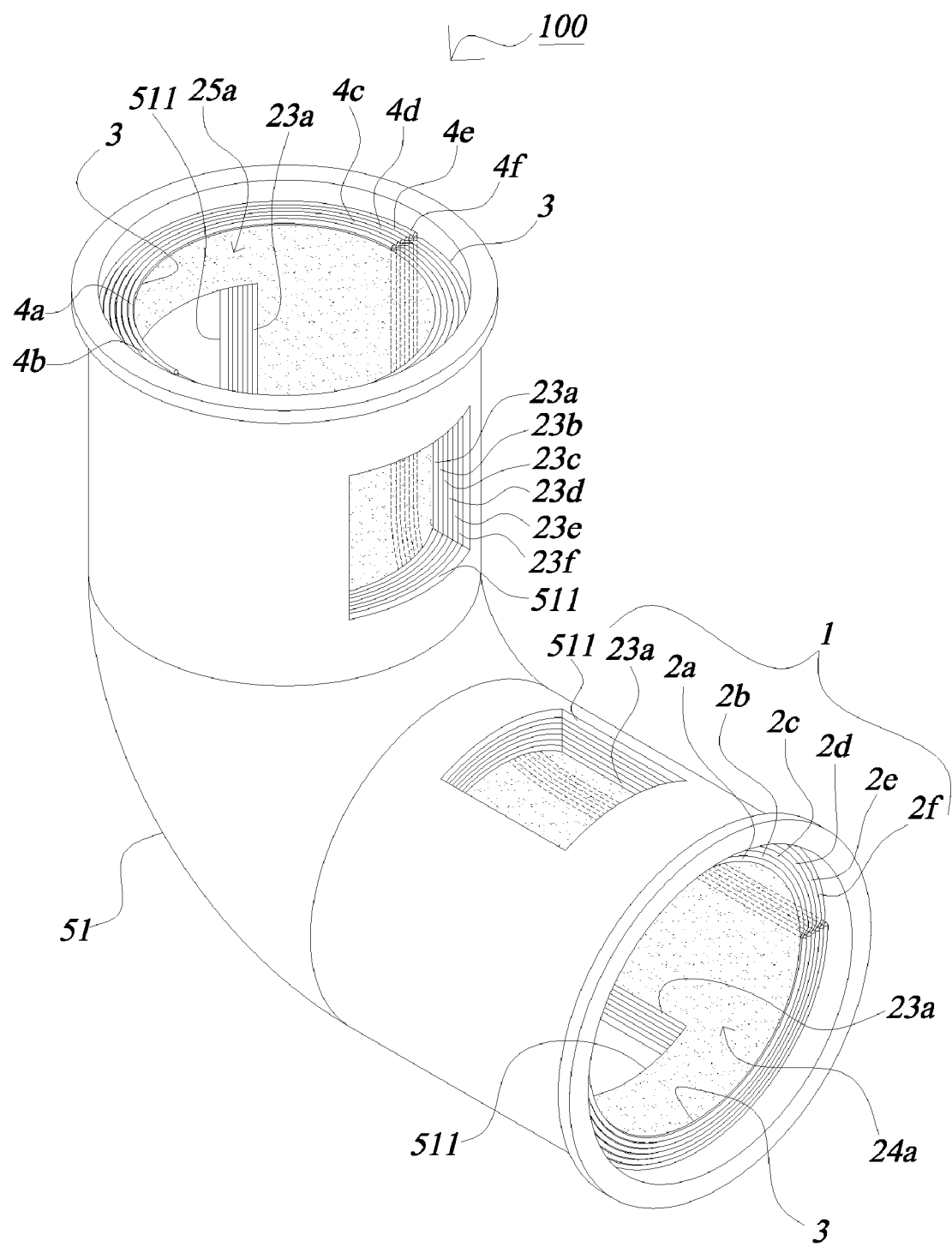
FIG. 7 is a schematic view of the present invention with side openings.

Referring to FIGS. 5 and 6, the proper function of the present invention is described in detail hereinafter: when the innermost dust collecting tube (2a) of the dust collecting tube set (1) has collected harmful substance (6) to its maximum capacity and is needed to remove, the user pulls the innermost pull string (4a), disengaging the tube (2a) from a second layer tube (2b). Disengaged tube (2a) is moved and pulled by the force and is extracted from the air conduit (51). Once the innermost dust collecting tube (2a) is removed, the second layer tube (2b) becomes the innermost tube and the second layer inlet and outlet (24b, 25b) become the new inlet and outlet of the air conduit (51).

When the second layer tube (2b), which is the new innermost tube collects harmful substance (6) to its maximum, it is removed from said dust collecting tube set (1) and the third layer tube (2c) replacing the second layer tube (2b), being the innermost tube. The fourth and fifth tubes (2d, 2e) will replace its precedent tube consecutively until the outmost dust collecting tube (2f) is removed from the air conduit. Once all dust collecting tubes (2a-2f) of the tube set (1) are removed, a new or recycled tube set (1) is installed in the air conduit (51) for purifying the air.

Removed dust collecting tubes can be discarded or cleaned by passing a high potential water curtain contained detergent or by equivalent cleaning method to remove the harmful substance (6) attached thereon. A new layer of adhesive can be applied by spraying or other method onto said tubes, thus said dust collecting tubes can be reused again.

The thickness of each dust collecting tube (2a-2f) has been increased for illustration purpose. The original thickness of the tube should be as thin as ordinary paper or cloth for not blocking the air flow when multiples are coupled with each other.

While specific embodiments of the invention have been shown and described in detail to illustrate the application of the principles of the invention, it will be understood that the invention may be embodied otherwise without departing from such principles.

The invention claimed is:

1. A removable dust collecting device (100) for an air conduit consists essentially of:
   a dust collecting tubes set (1); the set (1) is provided about an inner wall of an air conduit (51); said set (1) includes a plurality of hollow dust collecting tubes (2a-2f) made of soft material and having different diameters; said dust collecting tubes (2a-2f) are arranged in a concentric fashion by covering the one having small diameter with another one having larger diameter; the tubes (2a-2f), after collecting dust fully, are removed from the air conduit (51) sequentially from an innermost tube;
   an adhesive layer (3) is applied on each inner surface (21a-21f) of said dust collecting tubes (2a-2f) and on an outer surface (22f) of the outmost dust collecting tube (2f) for attaching each other and collecting dust; and
   an intake (24a-24f) is provided respectively at an end of said dust collecting tubes (2a-2f) where is about an air conditioning unit (5); an outlet (25a-25f) is provided respectively at an end of said dust collecting tubes (2a-2f) where connected to an air conditioning tube (51), and a pull string (4a-4f) is provided longitudinally on said dust collecting tubes (2a-2f) and extended from two extreme ends hereof for removing the tubes (2a-2f).

2. The removable dust collecting device (100) of claim 1, wherein a plurality of side openings (23a-23f) are provided between two ends of said dust collecting tubes (2a-2f), corresponding to where a plurality of side outlets (511) of said air conditioning tube (51) are provided.

3. The removable dust collecting device (100) of claim 1, wherein a removable filter (7) is further attached to the inlets (24a-24f), provided at where said concentric dust collecting tubes (2a-2f) engaged with the air conditioning unit (5).

4. The removable dust collecting device (100) of claim 1, wherein said dust collecting tubes (2a-2f) are made of fabric, paper or plastic.

5. The removable dust collecting device (100) of claim 1, wherein a layer of an antibiotic, a germicidal, a deodorant material or a combination of said three materials are added into said adhesive layer (3).

6. The removable dust collecting device (100) of claim 1, wherein a closing circle (26a-26f) is provided at both ends of said dust collecting tubes (2a-2f) respectively as closure, and is attached to each of said pull strings (4a-4f).

* * * * *